US008563983B2

(12) United States Patent
Hida et al.

(10) Patent No.: US 8,563,983 B2
(45) Date of Patent: Oct. 22, 2013

(54) DISPLAY PANEL, DISPLAY DEVICE, AND METHOD MANUFACTURING SAME

(75) Inventors: Yasuhiro Hida, Osaka (JP); Gen Nagaoka, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 133 days.

(21) Appl. No.: 13/392,379

(22) PCT Filed: Apr. 6, 2010

(86) PCT No.: PCT/JP2010/056221
§ 371 (c)(1),
(2), (4) Date: Feb. 24, 2012

(87) PCT Pub. No.: WO2011/024503
PCT Pub. Date: Mar. 3, 2011

(65) Prior Publication Data
US 2012/0146022 A1    Jun. 14, 2012

(30) Foreign Application Priority Data

Aug. 25, 2009   (JP) ................................. 2009-194408

(51) Int. Cl.
*H01L 27/14*   (2006.01)
*H01L 21/00*   (2006.01)
(52) U.S. Cl.
USPC ........ 257/72; 257/E27.119; 438/34; 438/151; 345/76
(58) Field of Classification Search
USPC ....................... 438/34, 151; 257/72, E27.119
See application file for complete search history.

(56) References Cited

U.S. PATENT DOCUMENTS

| 6,509,616 | B2 * | 1/2003 | Yamazaki | 257/390 |
| 6,621,536 | B1 * | 9/2003 | Taguchi | 349/40 |
| 2001/0028418 | A1 * | 10/2001 | Ozaki et al. | 349/54 |
| 2004/0212772 | A1 * | 10/2004 | Hanakawa et al. | 349/153 |
| 2007/0085805 | A1 | 4/2007 | Ishii et al. | |

FOREIGN PATENT DOCUMENTS

| JP | 1-90080 | 6/1989 |
| JP | 6-301049 | 10/1994 |

(Continued)

OTHER PUBLICATIONS

International Search Report and Written Opinion mailed May 11, 2010, directed to counterpart International Application No. PCT/JP2010/056221; 6 pages.

*Primary Examiner* — Steven J Fulk
(74) *Attorney, Agent, or Firm* — Morrison & Foerster LLP

(57) ABSTRACT

The invention provides a display panel and display device enabling easy connection to an external connection component depending on the type of a mounted component, and provides a display device manufacturing method allowing a simple manufacturing process. The display panel of the present invention is a display panel in which a thin film transistor array substrate and an opposed substrate are disposed opposing each other. The thin film transistor array substrate has a first routing wiring that is routed at the outer edge of the substrate, a common transfer section that is formed at a position overlapping with the first routing wiring when the substrate surface is viewed from a normal direction, and a first terminal region, having a plurality of terminals formed thereon including a terminal that is joined to the first routing wiring, at an end portion of the substrate. The opposed substrate has a second routing wiring, and a second terminal region, having a plurality of terminals formed thereon including a terminal that is joined to the second routing wiring, at an end portion of the substrate. The first routing wiring and the second routing wiring conduct with each other via the common transfer section.

7 Claims, 9 Drawing Sheets

(56) References Cited

FOREIGN PATENT DOCUMENTS

| JP | 11-223829 | 8/1999 |
| JP | 2004-253303 | 9/2004 |
| JP | 2006-267977 | 10/2006 |
| JP | 2007-78931 | 3/2007 |
| JP | 2007-140479 | 6/2007 |
| JP | 2007-226000 | 9/2007 |
| JP | 2008-26771 | 2/2008 |

* cited by examiner

DISPLAY PANEL, DISPLAY DEVICE, AND METHOD MANUFACTURING SAME

REFERENCE TO RELATED APPLICATIONS

This application is the national stage under 35 USC 371 of International Application No. PCT/JP2010/056221, filed Apr. 6, 2010, which claims priority from Japanese Patent Application No. 2009-194408, filed Aug. 25, 2009, the entire contents of which are incorporated herein by reference.

FIELD OF THE INVENTION

The present invention relates to a display panel, a display device and a method manufacturing same. More particularly, the present invention relates to a display panel having a circuit board in which an external connection terminal for connection of an external connection component is provided at an outer edge, and relates to a display device provided with the display panel, and to a manufacturing method thereof.

BACKGROUND OF THE INVENTION

Display devices such as television sets, PC displays, portable terminal displays and the like have a configuration wherein a display panel on which image display is carried out is electrically connected, by way of a mounted component, to an external connection component such as a printed wiring board (PWB) or a driving IC.

In response to the trend towards smaller and more light-weighted display devices in recent years, connection configurations have been proposed wherein a display panel and an external connection component are connected via a flexible printed board (flexible printed circuit: FPC) or a mounted component called a zebra connector.

A lightweight thin film having pliability, for instance a polyimide film or the like, can be used as the base material of an FPC. As a result, components can be mounted in a bent shape, and the mounting area can be reduced, which allows reducing the size and weight of the device. If the FPC is, for instance, a single-sided FPC in which a conductor is formed on only one of the faces of a base material, then a first connection terminal used for connection to a display panel and a second connection terminal used for connection to a printed circuit board are formed on the same face of the base material; then, with the substrate in a bent state, the first connection terminal can be connected to a terminal that is formed on the side of a thin film transistor array substrate (TFT array substrate) that makes up the display panel, while the second connection terminal can be connected to the printed circuit board through insertion into a connector.

The zebra connector can be connected to both the display panel and the printed circuit board that are disposed opposing each other, by being inserted between the display panel and the printed circuit board. This allows simplifying the mounting process and reducing costs. Herein, the printed circuit board is ordinarily disposed on the TFT array substrate side. Therefore, a color filter substrate (CF substrate) protrudes beyond the TFT array substrate, such that a terminal is formed at this protruding portion. A zebra connector is disposed between the CF substrate and the printed circuit board to elicit thereby the above-described connection.

Thus, the FPC must be connected on the TFT array substrate side, and the zebra connector must be connected on the CF substrate side. In current display panel designs, therefore, two types of display panel are produced, so as to support the type of the mounted component, namely display panels in which a connection terminal is formed on a TFT array substrate side and display panels in which a terminal region is formed on a CF substrate side. Accordingly, not only are two types of mask patterns necessary, namely a mask pattern for forming a terminal region on the TFT array substrate side, and a mask pattern for forming a terminal region on the CF substrate side, in accordance with the type of the mounted component, but also the display panel cannot accommodate modifications in the mounted component after the display panel has been produced.

Patent document 1 discloses a method for inexpensive connection of a display panel and an external connection component, wherein the method involves mounting a driver IC at a terminal region that is formed on a TFT array substrate side; and mounting an driver IC that is connected to a scanning-side electrode of a TFT array substrate, by drawing a terminal region, formed on a CF substrate side, onto a element glass, via a conductive layer; to reduce as a result the number of FPCs that are used to connect the display panel and the external connection component, and cut manufacturing costs accordingly.

Patent document 1: JP 11-223829 A

Depending on the type of a mounted component, however, there are cases, in the configuration of Patent document 1 above, where an external connection component is connected to a terminal region that is formed on a TFT array substrate side, and cases where a external connection component is connected to a terminal region that is formed on a CF substrate side. At present, thus, the terminal region is formed beforehand in either substrate depending on the type of mounted component to be used.

SUMMARY OF THE INVENTION

In the light of the above, it is an object of the present invention to provide a display panel and display device that enable easy connection to an external connection component depending on the type of a mounted component, and that has a simple manufacturing process, and to provide a method for manufacturing the display device.

The inventors conducted various studies on display devices provided with display panels, and focused first on a configuration wherein a terminal region of a display panel is formed beforehand on either of a thin film transistor array substrate and an opposed substrate, which make up a display panel, depending on the type of a mounted component. The inventors found that design modifications of the mounted component can be accommodated, even after production of the display panel, by virtue of a configuration wherein the terminal region is formed at an end portion of both substrates, and first routing wiring that is formed on the thin film transistor array substrate and second routing wiring that is formed on the opposed substrate are electrically connected via a common transfer section. The inventors found also that the display panel and the external connection component can be easily connected by cleaving an end portion, of either substrate, standing at an edge further toward the outer side thereof than the common transfer section, thereby exposing the terminal region, such that the display panel and the external connection component are connected using this terminal region. The inventors found that the above problems could be admirably solved thereby, and arrived thus at the present invention.

Specifically, the present invention is a display panel in which a thin film transistor array substrate and an opposed substrate are disposed opposing each other, wherein the thin film transistor array substrate comprises a first routing wiring that is routed at an outer edge of the substrate, a common transfer section that is formed at a position overlapping with the first routing wiring when the substrate surface is viewed from a normal direction, and a first terminal region, including a plurality of terminals formed thereon including a terminal that is joined to the first routing wiring, at an end portion of the substrate; the opposed substrate comprises a second routing wiring, and a second terminal region, including a plurality of terminals formed thereon including a terminal that is joined to the second routing wiring, at an end portion of the substrate; and the first routing wiring and the second routing wiring conduct with each other via the common transfer section.

The thin film transistor array substrate comprises, on a main surface of a support substrate, a plurality of pixels that are demarcated by source lines and gate lines. At each pixel, a thin film transistor is formed in the vicinity of the intersection of a source line and a gate line. The routed first routing wiring is formed outward of the pixel region at which the plurality of pixels is disposed, i.e. at the outer edge of the substrate. The first routing wiring is connected to any one of the plurality of terminals at the terminal region that is formed at the end portion of the substrate. The end portion of the substrate need only be at least part of a portion outward of the pixel region, and in ordinary display panels, is usually a portion used for connection with an external connection component.

The common transfer section elicits conduction between the first routing wiring and the second routing wiring. For instance, the common transfer section is formed by forming a contact hole in an insulation film that is formed on a main surface of the thin film transistor array substrate, and by filling this contact hole with a conductor.

The opposed substrate is ordinarily a CF substrate, such that a color filter layer for color display and a light-shielding section for demarcating adjacent pixels are formed on a main surface of the support substrate. The second routing wiring is formed at the outer edge of the opposed substrate, and is connected to any one of the plurality of terminals at the terminal region that is formed at the end portion of the substrate.

As the display panel there can be used various display panels, for instance a liquid crystal display panel, a plasma display panel (PDP), a field emission display panel (FED), a vacuum fluorescence display (VFD) panel or a panel for electronic paper, but is preferably a liquid crystal display panel.

In the display panel of the present invention, thus, a terminal region for connection of an external connection component is formed also at the end portion of either substrate from among the thin film transistor array substrate and the opposed substrate. Therefore, various mounted components such as FPCs, zebra connectors and the like can be accommodated, and also design modifications of the mounted component can be coped with, by way of a simple feature wherein cleaving is performed at the end portion of either substrate, in accordance with the type of a mounted component, to expose thereby the terminal formed at the other substrate, as described below.

In a preferred embodiment of the display panel according to the present invention, the first routing wiring and the second routing wiring include identical wiring patterns; and the first terminal region and the second terminal region are at an overlapping position, with the substrate surface viewed from a normal direction. In such a configuration, the first routing wiring and the second routing wiring can be formed using a mask of identical mask pattern. As a result, the manufacturing process is streamlined and manufacturing costs reduced. Also, leak current in the display device can be reduced by using an identical wiring pattern in the first routing wiring and the second routing wiring. Herein, identical wiring patterns encompass also substantially identical wiring patterns, so long as the manufacturing process and can be streamlined and manufacturing costs reduced, as described above, or the abovementioned leak current can be reduced.

The present invention is also a display panel in which a thin film transistor array substrate and an opposed substrate are disposed opposing each other, wherein the thin film transistor array substrate comprises a first routing wiring that is routed at an outer edge of the substrate, and a common transfer section formed at a position overlapping with the first routing wiring when the substrate surface is viewed from a normal direction; the opposed substrate comprises a second routing wiring; the first routing wiring and the second routing wiring conduct with each other via the common transfer section; and, in the opposed substrate, a terminal region, provided with a plurality of terminals for connection with an external connection component, is exposed at en edge further toward an outer side of the substrate than the common transfer section when the substrate surface is viewed from a normal direction.

A display panel having such a configuration can be ideally used in a case of connection with an external connection component using a mounted component in the form of a plate-like connector that is capable of conducting in a perpendicular direction. That is, the present invention is also a display device comprising the above display panel, an external connection component, and a mounted component that connects the display panel and the external connection component, wherein the mounted component is a plate-like connector that is capable of conducting in a perpendicular direction; and the display panel is connected to the external connection component via the mounted component that is mounted on a terminal formed in the opposed substrate. Herein, the perpendicular direction denotes ordinarily a direction that can be evaluated as a height direction with respect to the main surface of a plate-like connector.

The present invention is also a display panel in which a thin film transistor array substrate and an opposed substrate are disposed opposing each other, wherein the thin film transistor array substrate comprises a first routing wiring that is routed at an outer edge of the substrate, and a common transfer section that is formed at a position overlapping with the first routing wiring when the substrate surface is viewed from a normal direction; the opposed substrate comprises a second routing wiring; the first routing wiring and the second routing wiring conduct with each other via the common transfer section; and in the thin film transistor array substrate, a terminal region, provided with a plurality of terminals for connection with an external connection component, is exposed at an edge further toward an outer side of the substrate than the common transfer section when the substrate surface is viewed from a normal direction.

A display panel having such a configuration can be ideally used for connection of an external connection component, using a flexible printed board as the mounted component. That is, the present invention is also a display device comprising the abovementioned display panel, an external connection component, and a mounted component that connects the display panel and the external connection component, wherein the mounted component is a flexible printed board; and the display panel is connected to the external connection component via the mounted component that is mounted on a terminal formed in the thin film transistor array substrate. The flexible printed board can be fabricated to highly finer features (fine-pitch) of circuits than the abovementioned plate-like connector.

In the display device according to the present invention, the display panel and the external connection component are joined via the mounted component. Joining the mounted component to the display panel and/or the external connection component can be accomplished, for instance, according to a technique of joining that involves interposing an anisotropic conductive film between both components, with heating and pressing, or according to a technique of connection using solder or the like, or according to the process of COG (Chip on Glass).

The present invention is aimed also at a method of manufacturing a display device that comprises a display panel, an external connection component, and a mounted component that connects the display panel and the external connection component, the method including: a substrate cleaving step of performing cleaving an edge further toward an outer side of the substrate than the common transfer section, in one of substrates that make up the display panel of the present invention, to expose thereby a terminal region formed in the other one of the substrates; and a component mounting step of connecting the display panel and the external connection component via the mounted component that is mounted at the terminal region, wherein in the substrate cleaving step, the thin film transistor array substrate is cleaved when the mounted component is a plate-like connector that is capable of conducting in a perpendicular direction, and the opposed substrate is cleaved when the mounted component is a flexible printed board; in the component mounting step, the plate-like connector is mounted on the terminal region formed in the opposed substrate, to connect thereby the display panel and the external connection component, or, the flexible printed board is mounted on the terminal region formed in the thin film transistor array substrate, to connect thereby the display panel and the external connection component.

The present manufacturing method allows realizing the display device of the present invention in a simple an inexpensive manner, through a simple feature that involves performing cleaving at an edge further toward an outer side of the substrate than the common transfer section, in accordance with the type of the mounted component, to expose thereby a terminal region formed in the other substrate.

The substrate cleaving step involves performing cleaving fat an edge further toward an outer side of the substrate than the common transfer section, in one of the substrates that make up the display panel. The terminal region formed at the other substrate becomes exposed thereby. A wheel scriber or a diamond cutter may be used for cleaving the substrate. Cleaving of the substrate is performed in such a way so as not to damage lead-out wiring, terminals and so forth that are formed on the other substrate. For instance, a protective film is provided between the opposed substrate and the thin film transistor array substrate, at the substrate cleaving position, so that, during substrate cleaving, cleaving is performed on the protective film. As a result, this allows preventing damage or the like of the wiring in the substrate, on the side at which the terminal region is exposed. By providing such a protective film, the terminals at the terminal region become covered by the protective film. This elicits also the effect of suppressing corrosion of the terminals.

In the component mounting step, connection to the external connection component is realized by mounting the mounted component at a terminal region that is formed in the flexible printed board or the opposed substrate, depending on the type of the mounted component.

The elements of the display panel, display device, and production methods thereof of the present invention are not especially limited as long as they essentially include such elements. The display panel, display device, and production methods thereof may or may not include other elements.

The aforementioned modes may be employed in appropriate combination as long as the combination is not beyond the scope of the present invention.

In the display panel of the present invention, a terminal region is formed in either a TFT array substrate or an opposed substrate. Therefore, a display device can be manufactured easily by connecting a display panel and an external connection component thanks to a simple configuration wherein cleaving is performed at an end portion of either substrate, depending on the type of the mounted component, to expose thereby a desirable terminal region formed in the other substrate. Modifications in the mounted component can be thus accommodated simply by changing the cleaving position of the display panel. Therefore, the display panel can be shared across various types of mounted components.

DETAILED DESCRIPTION OF THE INVENTION

Figure 1:
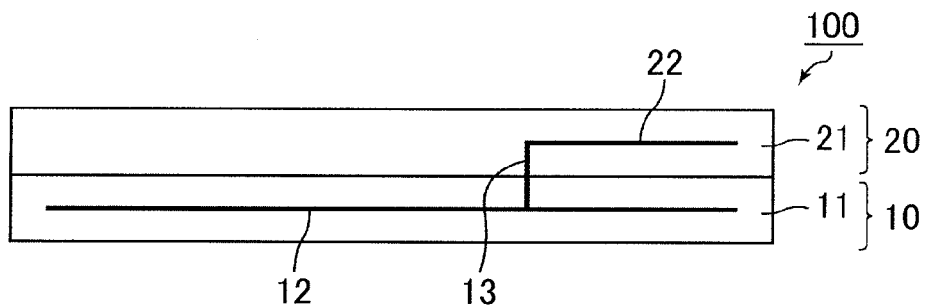
FIG. 1 is a vertical cross-sectional schematic diagram illustrating the configuration of a liquid crystal display panel according to Embodiment 1.

The present invention will be mentioned in more detail referring to the drawings in the following embodiments, but is not limited to these embodiments.

Embodiment 1

Figure 2:
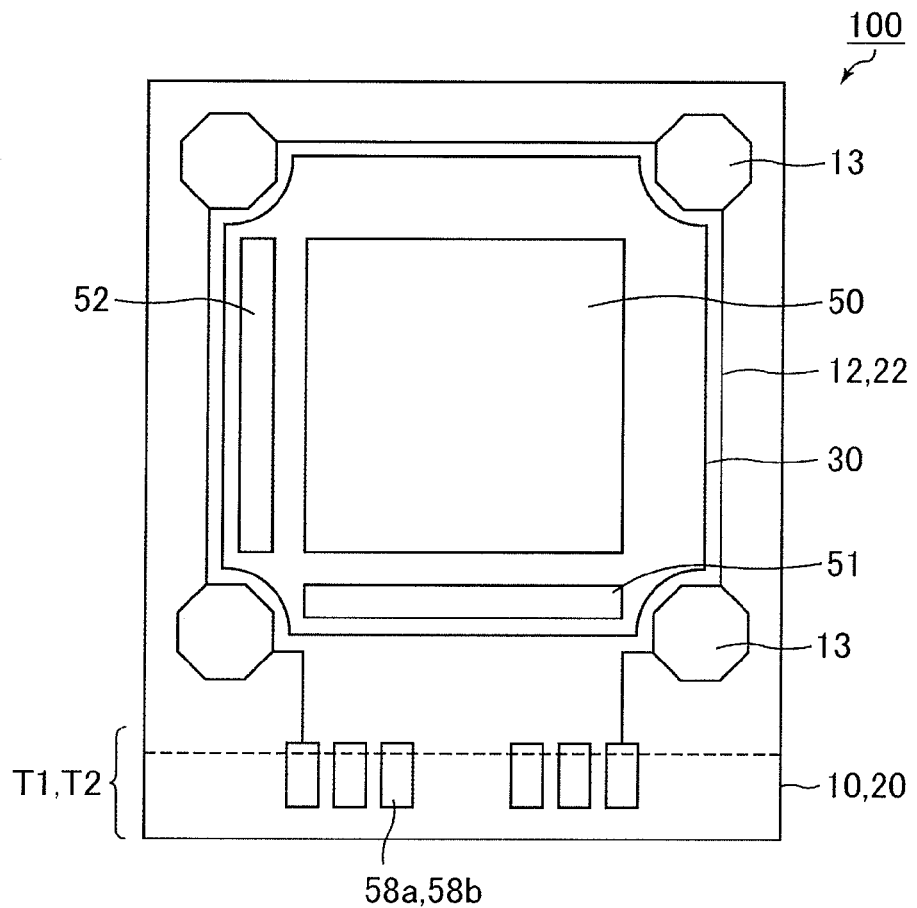
FIG. 2 is a plan-view schematic diagram illustrating the configuration of the liquid crystal display panel according to Embodiment 1.

In the present embodiment an example is explained wherein a liquid crystal display panel is used as a display panel. FIG. 1 is a vertical cross-sectional schematic diagram illustrating the configuration of a liquid crystal display panel according to Embodiment 1 of the present invention. FIG. 2 is a plan-view schematic diagram illustrating the configuration of the liquid crystal display panel.

In FIG. 1 and FIG. 2, a liquid crystal display panel 100, which is an active matrix-type liquid crystal display panel in which pixels are arrayed in the form of a matrix, has a configuration wherein a TFT array substrate 10 and an opposed substrate 20 are disposed opposing each other, with a liquid crystal layer (not shown) sandwiched between the two substrates. The TFT array substrate 10 and the opposed substrate 20 have substantially the same size in a plan view.

A first routing wiring 12 and a second routing wiring 22 provided in the liquid crystal display panel 100 are electrically connected using common transfer sections 13 that are formed at corners of the substrates. The common transfer sections 13 elicit conduction between the first routing wiring 12 and the second routing wiring 22. To form each common transfer section 13, a contact hole is formed in an insulation film that is formed on a main surface of the TFT array substrate 10, and a conductor is filled into the contact hole. The number of common transfer sections 13 is not particularly limited, but stable potential can be obtained by providing common transfer sections 13 at four corners of the substrates, as illustrated in FIG. 2.

As viewed from a normal direction to the substrate surface, the first routing wiring 12 and the second routing wiring 22 stand at overlapping positions and have the same pattern shape. The first routing wiring 12 extends up to a first terminal region T1 formed at an end portion of the substrate, and the second routing wiring 22 extends up to a second terminal region T2 formed at the end portion of the substrate. The first routing wiring 12 and second routing wiring 22 are formed using a same mask pattern. This allows simplifying the manufacturing process of the liquid crystal display panel 100 while reducing manufacturing costs.

The first routing wiring 12 and second routing wiring 22 in FIG. 1 are depicted, for convenience, inside support substrates 11, 21, but in actuality the first routing wiring 12 and second routing wiring 22 are formed on main surfaces of the respective substrates.

In a specific explanation of the configuration of the liquid crystal display panel 100, the TFT array substrate 10 that makes up the liquid crystal display panel 100 comprises a pixel region 50, a source driver 51, a gate driver 52, the first routing wiring 12, the common transfer sections 13 and the first terminal region T1 having a plurality of terminals 58a, formed on a main surface of the support substrate 11.

In the pixel region 50, though not shown in the figure, source lines and gate lines are disposed, in the form of a matrix, on a main surface of the support substrate 11, and TFTs, as switching elements, are formed in the vicinity of the intersections. A pixel electrode, an alignment layer and so forth are also provided in the pixel region 50. The source lines are connected to the source driver 51, and supply, to each pixel, a source signal that is sent from the exterior. The gate lines are connected to the gate driver 52, and supply, to each pixel, a gate signal sent from the exterior.

In the first routing wiring 12, counter-wiring (TCOM wiring) for supplying a predetermined potential to a counter electrode provided in the opposed substrate 20 is routed, along a rectangular route, at the outer edge of the substrate. The common transfer sections 13 are formed at the four corners of the substrate, and elicit conduction between the first routing wiring 12 and a counter electrode that is formed on a main surface of the opposed substrate 20. The second routing wiring 22 is connected to the counter electrode as described below.

The opposed substrate 20 is herein a CF substrate, such that a color filter layer for color display and a light-shielding section (black matrix) for partitioning adjacent pixels, are formed on a main surface of the support substrate 21. A common electrode, an alignment layer and so forth are formed on a main surface, on the liquid crystal layer side.

As described above, the second routing wiring 22 is at position that overlaps with the first routing wiring 12, with the substrate surface viewed from a normal direction. In the present embodiment, the second terminal region T2 is formed at the end portion of the opposed substrate 20, such that plural terminals 58b that are connected to the second routing wiring 22 are formed at the second terminal region T2. In ordinary opposed substrates, no terminals are formed at the end portion of the substrate, and the region is an ineffective region at which no elements such as driving circuits or the like are disposed.

The material of the support substrates 11, 21 that make up the TFT array substrate 10 and the opposed substrate 20 configured as described above is not particularly limited, but glass, resins (plastics) and so forth are appropriate herein. These materials are preferable in terms of their superior light transmissivity and processability.

Respective polarizing plates are provided on the TFT array substrate 10 and the opposed substrate 20 configured as described above, on a main surface, of each substrate, on the side opposite to that of the liquid crystal layer. Each polarizing plate has a configuration wherein a polarizer formed out of a PVA (polyvinyl alcohol) film having an iodine complex or a dichroic coloring matter adhered thereon is stacked between protective layers that are formed out of a cellulosic polymer such as triacetylcellulose (TAC) or the like. A respective viewing angle compensating film such as a retardation film or the like may be disposed between the polarizing plates and the TFT array substrate 10, and between the polarizing plates and the opposed substrate 20.

The TFT array substrate 10 and the opposed substrate 20 are bonded to each other via a sealing material 30 that is disposed at a region outside the display region at which image display is carried out, i.e. at an outside-display region. The material of the sealing material 30 is not particularly limited, and may be appropriately selected. The sealing material 30 is formed, in the substrate, outward of the source driver 51 and the gate driver 52, but inward of the common transfer sections 13. By virtue of such a configuration, the source driver 51 and the gate driver 52 become covered by the sealing material 30 or the liquid crystal layer, and are not exposed to outside air.

Corrosion can be prevented as a result. It becomes also possible to prevent contamination of the liquid crystal by, for instance, substrate debris that is formed during substrate cleaving, as described below.

The material of the liquid crystal layer is not particularly limited, and may be appropriately selected. The display mode of the liquid crystal is not particularly limited, and there may be used various modes such as a TN (Twisted Nematic) mode, an IPS (In Plane Switching) mode, a VATN (Vertical Alignment Twisted Nematic) mode or the like.

The liquid crystal display panel 100 may be of domain-division type, and may be of transmissive type, reflective type or of semitransmissive type (reflective/transmissive dual type).

Figure 3:
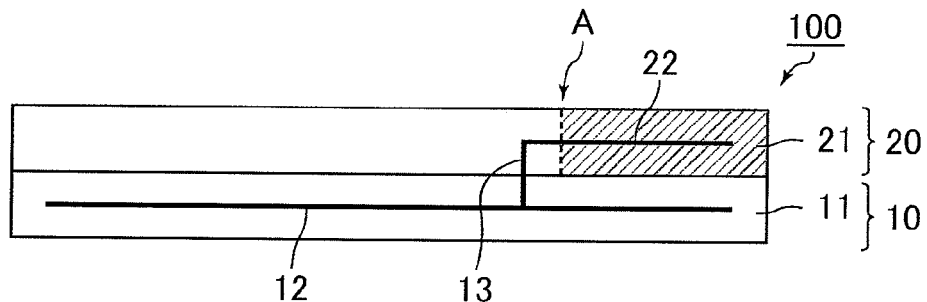
FIG. 3 is a vertical cross-sectional schematic diagram for explaining substrate cleaving when using an FPC as a mounted component.
Figure 4:
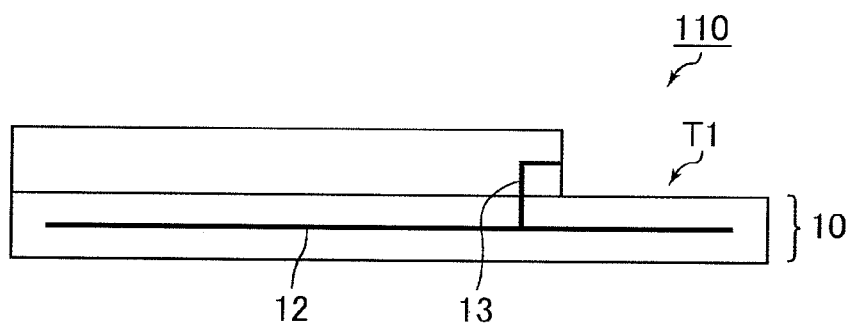
FIG. 4 is a vertical cross-sectional schematic diagram for explaining substrate cleaving when using an FPC as a mounted component.
Figure 5:
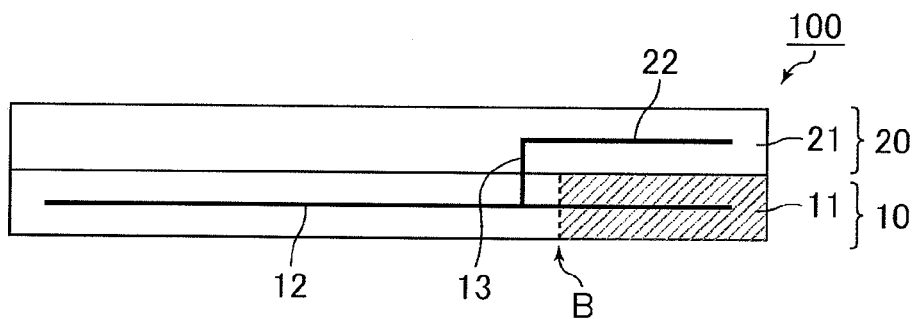
FIG. 5 is a vertical cross-sectional schematic diagram for explaining substrate cleaving when using a zebra connector as a mounted component.
Figure 6:
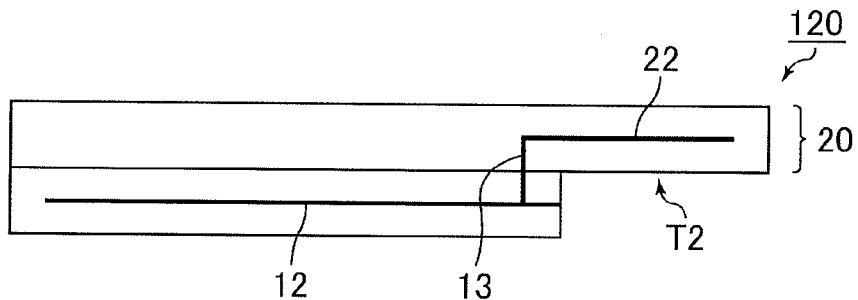
FIG. 6 is a vertical cross-sectional schematic diagram for explaining substrate cleaving when using a zebra connector as a mounted component.

In the liquid crystal display panel 100 having such a configuration, connection to external connection components can be easily accomplished simply by modifying the cleaving position in accordance with the type of a mounted component. A specific example will be explained below with reference to FIG. 3 to FIG. 6. FIG. 3 and FIG. 4 are vertical cross-sectional schematic diagrams for explaining a cleaving position of a substrate when using an FPC as a mounted component. FIG. 5 and FIG. 6 are vertical cross-sectional schematic diagrams for explaining a cleaving position of a substrate when using a zebra connector as a mounted component.

FIG. 3 illustrates the cleaving position of a substrate when using an FPC as a mounted component. To mount an FPC, the component is mounted on the first terminal region T1 that is formed in the TFT array substrate 10. To that end, the opposed substrate 20 of the liquid crystal display panel 100 is cleaved at a position of the wavy line A, in such a manner that the first terminal region T1 is exposed. A wheel scriber or a diamond cutter may be used for cleaving the substrate.

As a result there is obtained a liquid crystal display panel 110 in which the first terminal region T1 is exposed, as illustrated in FIG. 4. The liquid crystal display panel 110 and a printed circuit board, as an external connection component, are connected to each other through mounting of an FPC, by pressure-bonding or the like, onto the terminals 58a that are formed on the first terminal region T1, via a conductor such as an anisotropic conductive film or the like.

When using a zebra connector as the mounted component, the component is mounted on the second terminal region T2 that is formed on the opposed substrate 20, as illustrated in FIG. 5. To that end, the TFT array substrate 10 of the liquid crystal display panel 100 is cleaved at the position of the wavy line B, in such a manner that the second terminal region T2 is exposed.

As a result there is obtained a liquid crystal display panel 120 in which the second terminal region T2, on the TFT array substrate 10 side, is exposed, as illustrated in FIG. 6. The liquid crystal display panel 120 and a printed circuit board are connected to each other through mounting of the zebra connector at the terminals 58b that are formed at the second terminal region T2.

Figure 7:
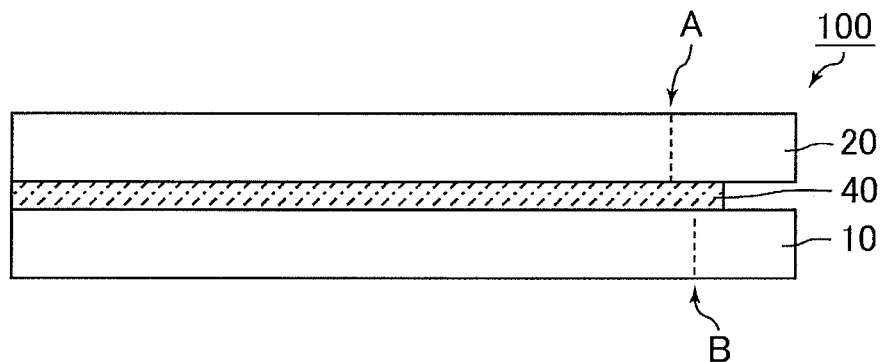
FIG. 7 is a vertical cross-sectional schematic diagram illustrating the configuration of a display panel provided with a protective film.

A protective film may be provided, as a method for preventing damage to terminals, wiring and so forth on the exposed side upon substrate cleaving. FIG. 7 is a vertical cross-sectional schematic diagram illustrating the configuration of a display panel provided with a protective film. The liquid crystal display panel 100 illustrated in FIG. 7 comprises a protective film 40 between the TFT array substrate 10 and the opposed substrate 20. As the protective film 40 there can be used a silicon oxide film, a silicon nitride film, an acrylic photosensitive resin or the like.

The protective film 40, for instance, is formed on a main surface of the TFT array substrate 10, further outward in the substrate than a cleaving position A of the opposed substrate 20 and than a cleaving position B of the TFT array substrate 10. The cleaving tolerance of the substrate is ±100 μm if the protective film 40 extends outward in the substrate by 200 μm beyond the cleaving position A and/or the cleaving position B. As a result, cleaving can be reliably performed on the protective film 40 while preventing damage to the wiring and so forth. Corrosion of the terminals 58a, 58b can also be prevented through covering of the cleaving sites with the protective film 40.

Embodiment 2

Figure 8:
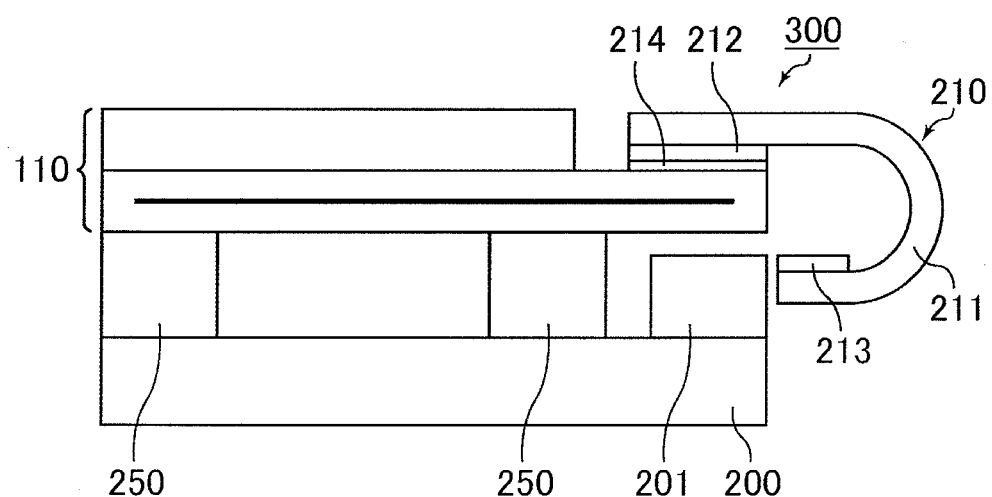
FIG. 8 is a vertical cross-sectional schematic diagram illustrating the configuration of a liquid crystal display panel according to Embodiment 2.
Figure 9:
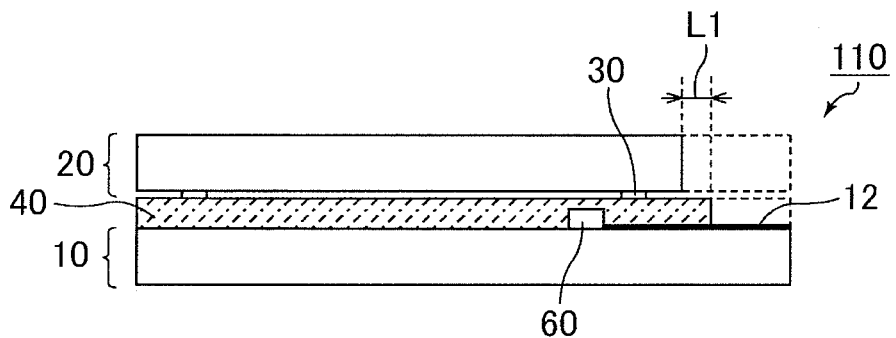
FIG. 9 is a vertical cross-sectional schematic diagram of a liquid crystal display panel illustrating the configuration of a liquid crystal display panel according to Embodiment 2.
Figure 10:
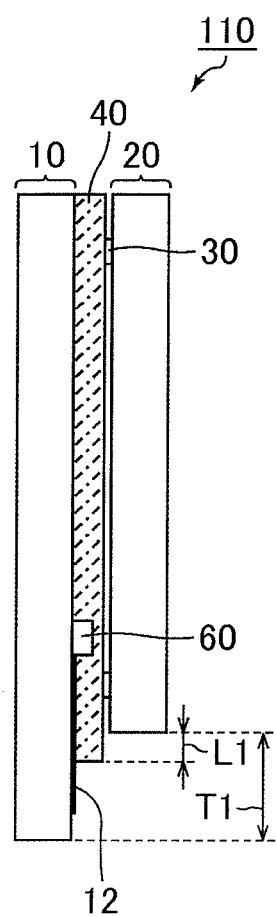
FIG. 10 is a vertical cross-sectional schematic diagram of a liquid crystal display panel illustrating the configuration of the liquid crystal display panel according to Embodiment 2.
Figure 11:
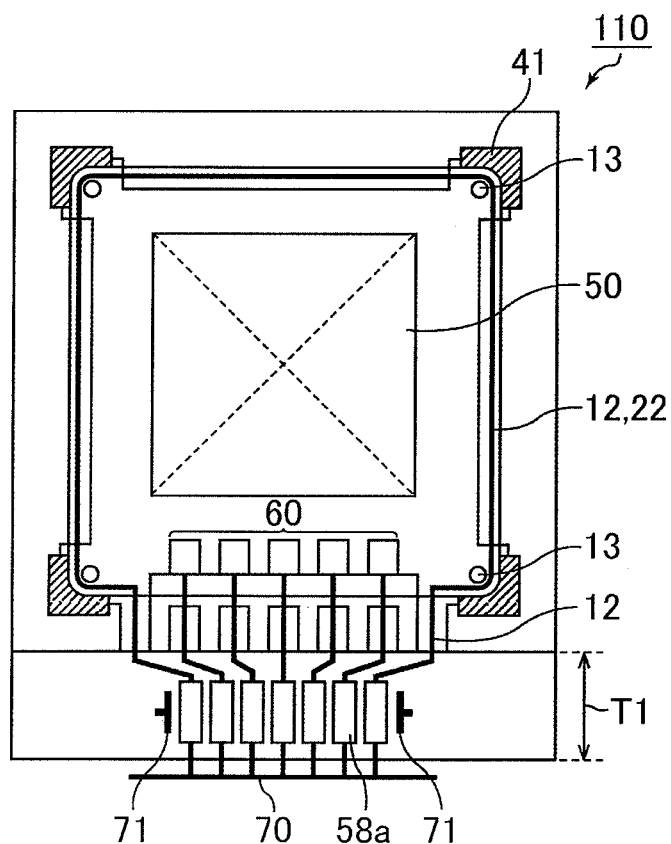
FIG. 11 is a plan-view schematic diagram of a liquid crystal display panel illustrating the configuration of the liquid crystal display panel according to Embodiment 2.

In the present embodiment there is explained a liquid crystal display device in which the liquid crystal display panel 110 according to Embodiment 1 and a printed circuit board are connected using an FPC. Features identical to those of FIG. 1 to FIG. 7 according to Embodiment 1 will be denoted with the same reference numerals and an explanation thereof will be omitted. FIG. 8 is a vertical cross-sectional schematic diagram illustrating the configuration of a liquid crystal display device according to the present embodiment. FIG. 9 to FIG. 11 are, respectively, a vertical cross-sectional schematic diagram and a plan-view schematic diagram illustrating the configuration of the liquid crystal display panel 110 according to the present embodiment.

In FIG. 8, a liquid crystal display device 300 comprises the liquid crystal display panel 110 in which an end portion of the opposed substrate 20 is in a cleaved state; a printed circuit board 200; and an FPC 210.

As illustrated in FIG. 9 to FIG. 11, the liquid crystal display panel 110 has a configuration wherein the TFT array substrate 10 and the opposed substrate 20 are bonded to each other via the sealing material 30, via the protective film 40.

In the TFT array substrate 10, in addition to the features of Embodiment 1 described above, a protective circuit 60 and a short ring 70 are also provided at the respective terminals 58a. The short ring 70 is formed of a transparent electrode such as indium tin oxide (ITO). Openings 41 are formed at the protective film 40, on the outer edge of the common transfer sections 13. Marks 71 for positioning of the FPC 210 are also provided in the first terminal region T1.

The protective film 40 is formed to be longer, by a length L1, than the opposed substrate 20. The length L1 of the exposed protective film 40 is set to, for instance, 200 μm. By setting such a length, damage to wiring and so forth formed in the TFT array substrate 10 upon cleaving of the opposed substrate 20 can be sufficiently prevented, as described above, taking into account the cleaving tolerance (±100 μm).

The FPC 210 is a single-sided FPC wherein a first connection terminal 212 and a second connection terminal 213 are formed on one face of a base material 211. The base material 211 is a pliable film base material formed out of, for instance, a polyimide film.

The purpose of the printed circuit board 200 is to drive the liquid crystal display panel 110. A connector 201 for mounting the FPC 210 is disposed at the end portion of the substrate.

The liquid crystal display panel 110, printed circuit board 200 and FPC 210 having the above configuration are disposed, by way of a spacer 250, in such a manner that the printed circuit board 200 opposes the face of the liquid crystal display panel 110 on the TFT array substrate 10 side. The first connection terminal 212 formed at one end of the FPC 210 is positioned with respect to the first terminal region T1 of the liquid crystal display panel 110 by means of the mark 71. The first connection terminal 212 is connected to the terminals 58a via an anisotropic conductive film 214. The other end of the FPC 210 is bent towards the printed circuit board 200, and the second connection terminal 213 is mounted onto the connector 201. As a result, the liquid crystal display panel 110 and the printed circuit board 200 become electrically connected to each other via the FPC 210.

In the liquid crystal display device 300 configured as described above, the printed circuit board 200 and the liquid crystal display panel 110 can be connected by the bent FPC 210. The device can be made smaller as a result. The FPC 210 can be fabricated to highly finer features (fine-pitch) of circuits than a below-described zebra rubber, and hence the width of the FPC 210 can be reduced, while lowering manufacturing costs.

Embodiment 3

Figure 12:
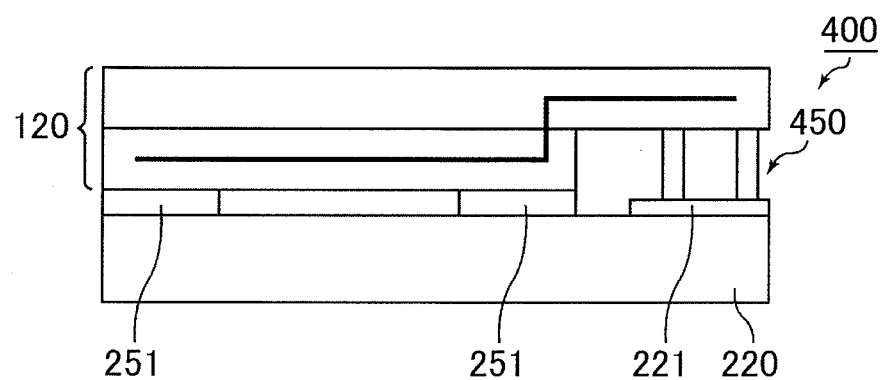
FIG. 12 is a vertical cross-sectional schematic diagram of a liquid crystal display device illustrating the configuration of a liquid crystal display device according to Embodiment 3.
Figure 13:
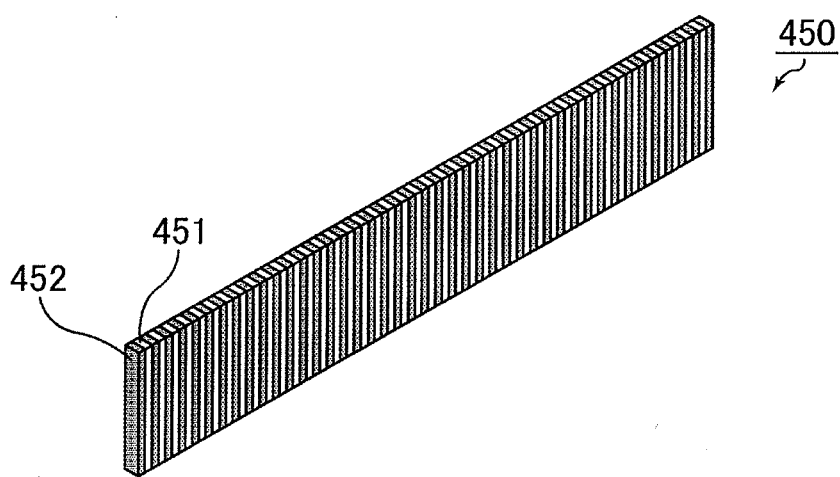
FIG. 13 is a perspective-view diagram illustrating the configuration of a zebra connector in the liquid crystal display device according to Embodiment 3.
Figure 14:
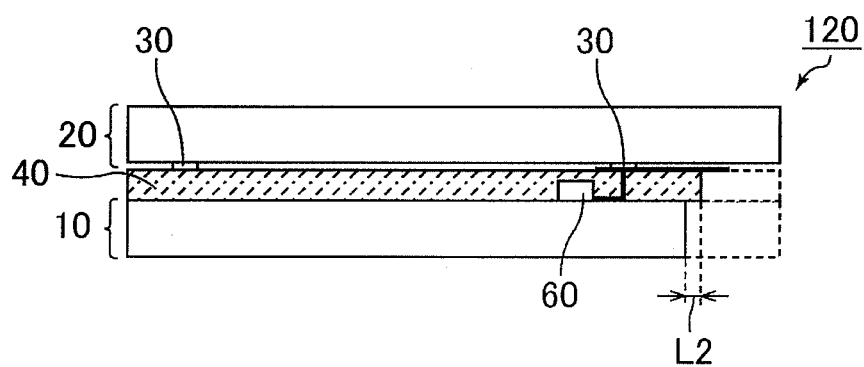
FIG. 14 is a vertical cross-sectional schematic diagram of a liquid crystal display panel illustrating the configuration of the liquid crystal display panel according to Embodiment 3.
Figure 15:
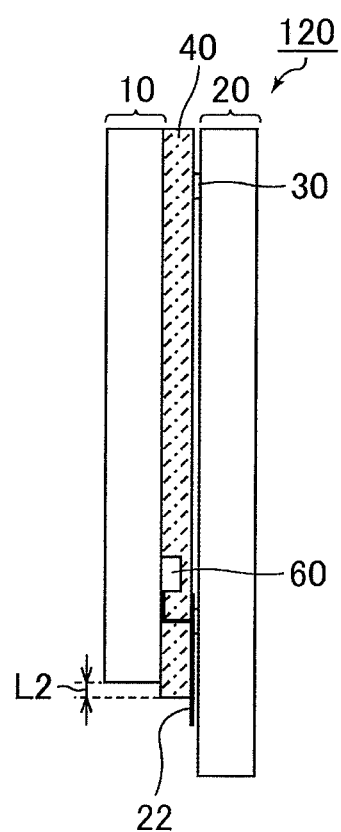
FIG. 15 is a vertical cross-sectional schematic diagram of a liquid crystal display panel illustrating the configuration of the liquid crystal display panel according to Embodiment 3.
Figure 16:
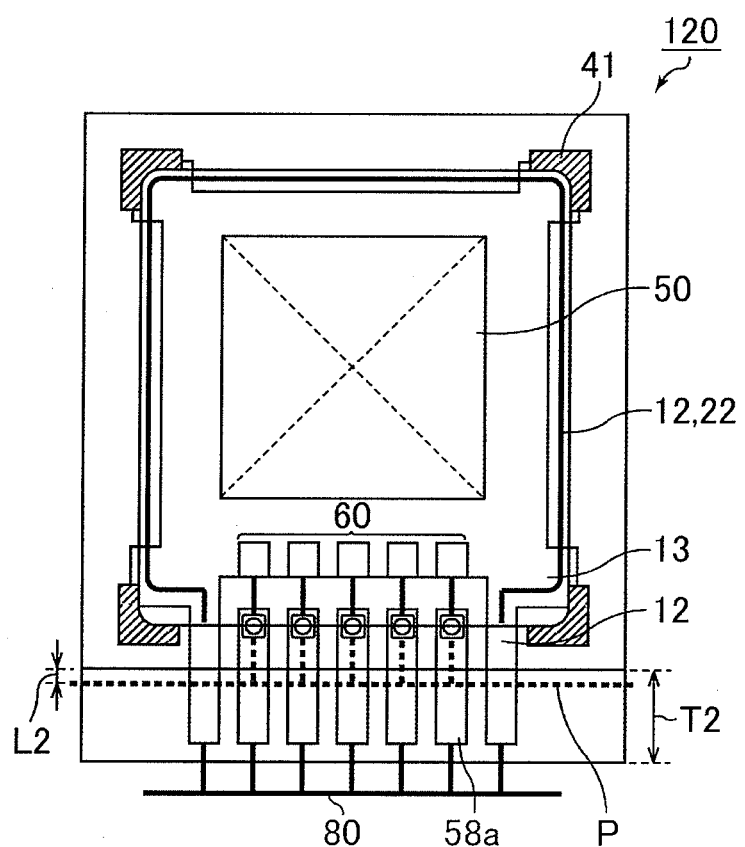
FIG. 16 is a plan-view schematic diagram of a liquid crystal display panel illustrating the configuration of the liquid crystal display panel according to Embodiment 3.

In the present embodiment there is explained a liquid crystal display device in which a liquid crystal display panel 120 according to Embodiment 1 and a printed circuit board 220 are connected using a zebra connector as the mounted component. Features identical to those of FIG. 1 to FIG. 11 according to Embodiments 1 and 2 will be denoted with the same reference numerals and an explanation thereof will be omitted. FIG. 12 is a vertical cross-sectional schematic diagram of a liquid crystal display device illustrating the configuration of a liquid crystal display device according to the present embodiment. FIG. 13 is a perspective-view diagram illustrating the configuration of a zebra connector in the liquid crystal display device according to the present embodiment. FIG. 14 to FIG. 16 illustrate the configuration of the liquid crystal display panel 120 according to the present embodiment. FIG. 14 and FIG. 15 illustrate vertical cross-sectional schematic diagrams of the liquid crystal display panel, and FIG. 16 illustrates a plan-view schematic diagram thereof.

In FIG. 12, a liquid crystal display device 400 comprises the liquid crystal display panel 120 in which an end portion of the TFT array substrate 10 is in a cleaved state; a printed circuit board 220; and zebra connector 450.

As illustrated in FIG. 14 to FIG. 16, the liquid crystal display panel 120 has a configuration wherein the TFT array substrate 10 and the opposed substrate 20 are bonded to each other via the sealing material 30, via the protective film 40.

In the TFT array substrate 10, in addition to the features of Embodiments 1 and 2 described above, the protective circuit 60 is also provided at the terminals 58b. A short ring 80 formed of a transparent electrode such as ITO or the like is also provided in the opposed substrate 20.

The protective film 40 is formed at a position denoted by a wavy line P, i.e. is formed beyond the cleaving position of the TFT array substrate 10 by a length L2. The length L2 of the protective film 40 is set to, for instance, 200 μm. Damage to wiring and so forth formed in the opposed substrate 20 during cleaving of the TFT array substrate 10 can be sufficiently prevented, as described above, by setting such a length taking also into account the cleaving tolerance (±100 μm). The terminals 58b for mounting the FPC 210 are exposed at the second terminal region T2.

As illustrated in FIG. 13, the zebra connector 450 is a plate-like connector that can conduct in a perpendicular direction. Herein, conducting portions 451 formed of a conductor and insulating portions 452 formed of an insulator are disposed alternating with each other.

The printed circuit board 220 has the same configuration as in Embodiment 2, but herein a connection terminal 221 is provided instead of the connector 201, and the printed circuit board 220 is disposed so as to oppose the face of the liquid crystal display panel 120, on the side of the TFT array substrate 10, across spacers 251. Thus, the printed circuit board 220 and the liquid crystal display panel 120 can be electrically connected to each other by mounting the connection terminal 221, which is formed at one end of the FPC 210, on the terminals 58b that are formed on the opposed substrate 20.

In the liquid crystal display device 400 having the above-described configuration, the printed circuit board 220 and the liquid crystal display panel 120 can be connected to each other while disposed in a mutually opposing state. The size of the device can be reduced as a result.

In the above embodiments, examples have been explained wherein the first routing wiring 12 and the second routing wiring 22 stand at overlapping positions, with the substrate surface viewed from a normal direction, but the present invention is not limited thereto, and the first routing wiring 12 and the second routing wiring 22 may be formed at non-overlapping positions. In such a configuration, the mask patterns used for manufacturing the display panel are greater in number when compared to the above embodiments, but various types of mounted component can be accommodated, even after production of the display panel.

In the above embodiments, examples have been explained in which the liquid crystal display panel 100 is an active-matrix liquid crystal display panel, but the present invention is not limited thereto, and the liquid crystal display panel 100 may be a passive-matrix liquid crystal display panel.

In the above embodiments, examples of a liquid crystal display panel 100 have been explained in which the source driver 51 and the gate driver 52 are monolithically integrated, but the present invention is not limited thereto, and can be used also in COG (Chip on Glass)-type liquid crystal display panels.

Figure 17:
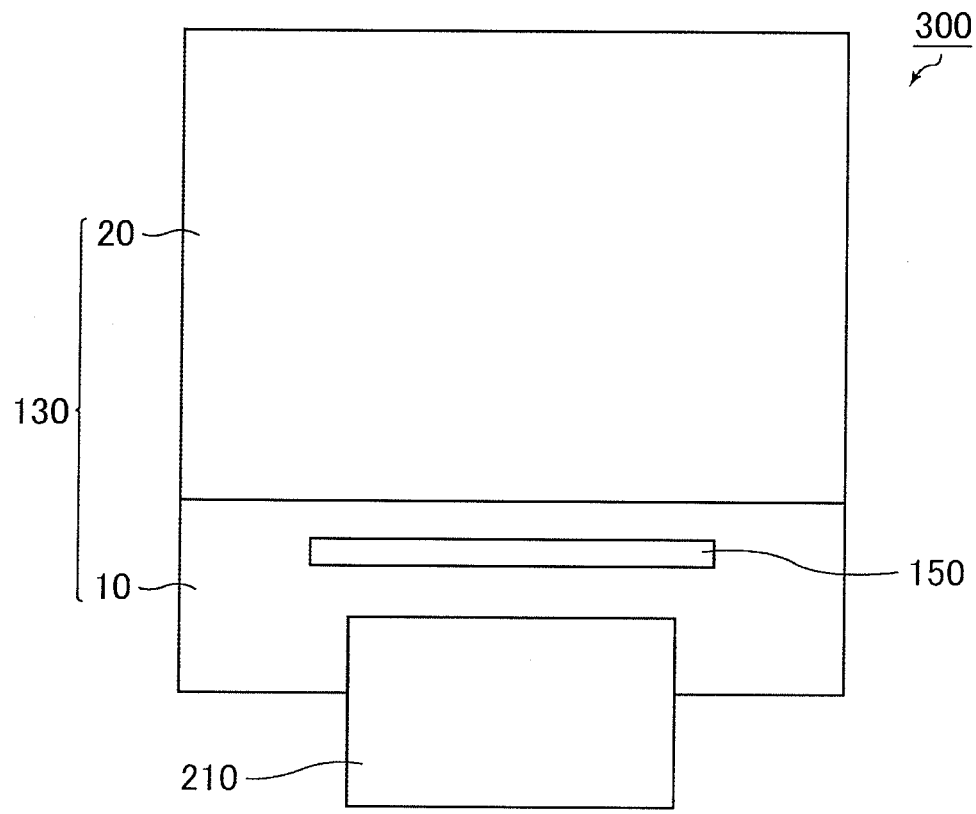
FIG. 17 is a plan-view schematic diagram illustrating the configuration of a liquid crystal display device that uses a COG-type liquid crystal display panel.
Figure 18:
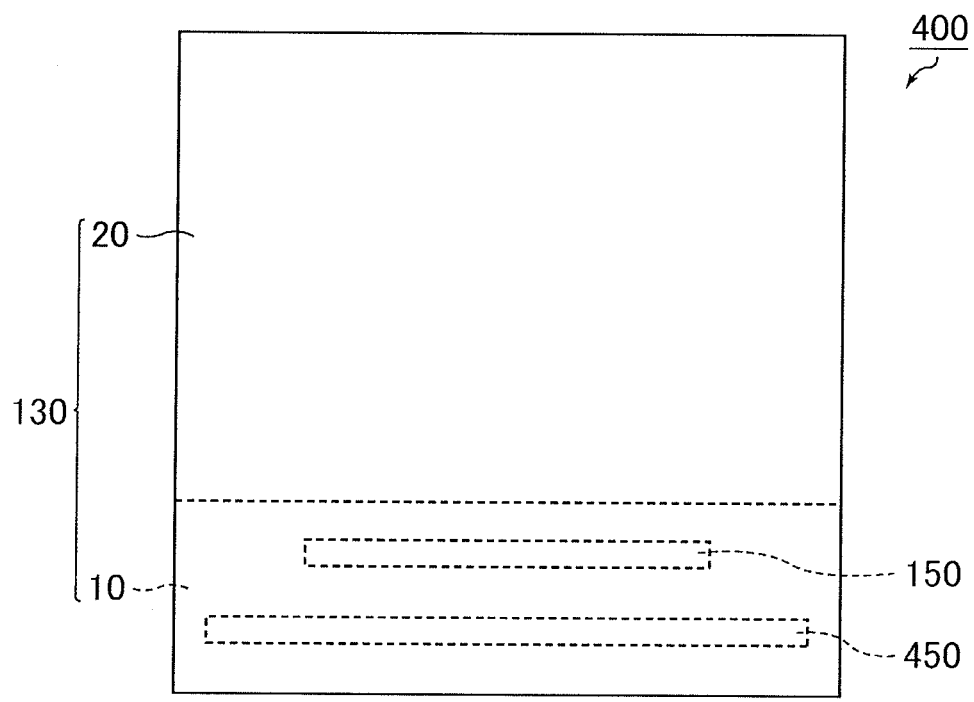
FIG. 18 is a plan-view schematic diagram illustrating the configuration of a liquid crystal display device that uses a COG-type liquid crystal display panel.

FIG. 17 and FIG. 18 are plan-view schematic diagrams illustrating the configuration of a liquid crystal display device that uses a COG-type liquid crystal display panel. A printed circuit board connected to the liquid crystal display panel has been omitted in FIG. 17 and FIG. 18. A liquid crystal display device 300 illustrated in FIG. 17 has an FPC 210 and a liquid crystal display panel 130 in which a driver IC 150 is mounted in COG fashion. The FPC 210 is connected to the TFT array substrate 10. A liquid crystal display device 400 illustrated in FIG. 18 has a zebra connector 450 and a liquid crystal display panel 130 on which a driver IC 150 is mounted in COG fashion. The zebra connector 450 is connected to the opposed substrate 20. Such a configuration elicits the same effects as the above-described embodiments.

In the above embodiments, examples have been explained wherein the display device uses a liquid crystal display panel, but the present invention is not limited thereto. The invention can be used also in various display devices having, for instance, a PDP, FED, VFD device, electronic paper or the like as a display panel, instead of a liquid crystal display panel. In a case where, for instance, a PDP panel is used in the display panel, then a display panel of a display device is produced using a display element that is made up of, for instance, electrodes, a dielectric, a noble gas, a fluorescence substance and so forth, instead of a display element that uses a liquid crystal. If an FED is used in the display panel, then a display panel of a display device is produced using a display element that is made up of a microchip, a gate electrode, and fluorescence substance and so forth, instead of a display element that uses a liquid crystal. Thus, the present invention can be used in various display devices, but is preferably used in liquid crystal display devices.

The aforementioned modes of the embodiments may be employed in appropriate combination as long as the combination is not beyond the scope of the present invention.

The present application claims priority to Patent Application No. 2009-194408 filed in Japan on Aug. 25, 2009 under the Paris Convention and provisions of national law in a designated State, the entire contents of which are hereby incorporated by reference.

DESCRIPTION OF THE REFERENCE NUMERALS

10 TFT array substrate
11, 21 support substrate
12 first routing wiring
13 common transfer section
20 opposed substrate
22 second routing wiring
30 sealing material
40 protective film
41 opening
50 pixel region
51 source driver
52 gate driver
58a, 58b terminal
60 protective circuit
70, 80 short ring
71 mark
100, 110, 120, 130 liquid crystal display panel
150 driver IC
200, 220 printed circuit board
201 connector
210 FPC
211 base material
212 first connection terminal
213 second connection terminal
221 connection terminal
214 anisotropic conductive film
250, 251 spacer
300, 400 liquid crystal display device
450 zebra connector
451 conducting portion
452 insulating portion
A, B cleaving position
T1 first terminal region
T2 second terminal region
L1, L2 length

The invention claimed is:

1. A display panel in which a thin film transistor array substrate and an opposed substrate are disposed opposing each other, wherein
the thin film transistor array substrate comprises a first routing wiring that is routed at an outer edge of the substrate, a common transfer section that is formed at a position overlapping with the first routing wiring when the substrate surface viewed from a normal direction, and a first terminal region, including a plurality of terminals formed thereon including a terminal that is joined to the first routing wiring, at an end portion of the substrate;
the opposed substrate comprises a second routing wiring, and a second terminal region, including a plurality of terminals formed thereon including a terminal that is joined to the second routing wiring, at an end portion of the substrate; and
the first routing wiring and the second routing wiring conduct with each other via the common transfer section.

2. The display panel according to claim 1, wherein
the first routing wiring and the second routing wiring include identical wiring patterns, and
the first terminal region and the second terminal region are at an overlapping position when the substrate surface is viewed from a normal direction.

3. A display panel in which a thin film transistor array substrate and an opposed substrate are disposed opposing each other, wherein
the thin film transistor array substrate comprises a first routing wiring that is routed at an outer edge of the substrate, and a common transfer section formed at a position overlapping with the first routing wiring when the substrate surface is viewed from a normal direction,
the opposed substrate comprises a second routing wiring,
the first routing wiring and the second routing wiring conduct with each other via the common transfer section, and
in the opposed substrate, a terminal region, provided with a plurality of terminals for connection with an external connection component, is exposed at an edge further toward an outer side of the substrate than the common transfer section when the substrate surface is viewed from a normal direction.

4. A display device comprising the display panel according to claim 3, an external connection component, and a mounted component that connects the display panel and the external connection component, wherein
the mounted component is a plate-like connector that is capable of conducting in a perpendicular direction, and
the display panel is connected to the external connection component via the mounted component that is mounted on a terminal formed in the opposed substrate.

5. A display panel in which a thin film transistor array substrate and an opposed substrate are disposed opposing each other, wherein
the thin film transistor array substrate comprises a first routing wiring that is routed at an outer edge of the substrate, a common transfer section that is formed at a position overlapping with the first routing wiring when the substrate surface is viewed from a normal direction,
the opposed substrate comprises a second routing wiring,
the first routing wiring and the second routing wiring conduct with each other via the common transfer section,
in the thin film transistor array substrate, a terminal region, provided with a plurality of terminals for connection with an external connection component, is exposed at an edge further toward an outer side of the substrate than the common transfer section when the substrate surface is viewed from a normal direction.

6. A display device comprising the display panel according to claim 5, an external connection component, and a mounted component that connects the display panel and the external connection component, wherein
the mounted component is a flexible printed board, and
the display panel is connected to the external connection component via the mounted component that is mounted on a terminal formed in the thin film transistor array substrate.

7. A method of manufacturing a display device including a display panel, an external connection component, and a mounted component that connects the display panel and the external connection component,
the method comprising:
a substrate cleaving step of performing cleaving at an edge further toward an outer side of the substrate than the common transfer section, in one of substrates that make up the display panel according to claim 1, to expose thereby a terminal region formed in the other one of the substrates; and a component mounting step of connecting the display panel and the external connection component via the mounted component that is mounted at the terminal region, wherein in the substrate cleaving step, the thin film transistor array substrate is cleaved when the mounted component is a plate-like connector that is capable of conducting in a perpendicular direction, and the opposed substrate is cleaved when the mounted component is a flexible printed board, and in the component mounting step, the plate-like connector is mounted on the terminal region formed in the opposed substrate, to connect thereby the display panel and the external connection component, or the flexible printed board is mounted on the terminal region formed in the thin film transistor array substrate, to connect thereby the display panel and the external connection component.

* * * * *